United States Patent [19]

Ferland

[11] Patent Number: 5,726,388
[45] Date of Patent: Mar. 10, 1998

[54] CABLE ASSEMBLY FOR CONNECTING PERIPHERAL DEVICES TO A TERMINAL

[75] Inventor: Albert J. Ferland, Penfield, N.Y.

[73] Assignee: PSC Inc., Webster, N.Y.

[21] Appl. No.: 332,211

[22] Filed: Oct. 31, 1994

[51] Int. Cl.$^6$ ............................................. H02G 15/007
[52] U.S. Cl. .............................. 174/72 C; 174/135
[58] Field of Search ....................... 174/72 C, 72 R, 174/135, 71 R, 69, 65 R; 439/282, 502, 503, 504, 505, 506, 623, 624

[56] References Cited

U.S. PATENT DOCUMENTS 5,243,136  9/1993  Chen ........................................ 174/72 C

FOREIGN PATENT DOCUMENTS 1165295  10/1958  France .
762800   3/1953   Germany .
1117195  11/1961  Germany .
1257029  10/1989  Japan .

*Primary Examiner*—Hyung S. Sough
*Assistant Examiner*—Dean A. Reichard
*Attorney, Agent, or Firm*—Foley & Lardner

[57] ABSTRACT

A cable assembly enables a plurality of cables to be connected to circuitry in a module enclosed in a housing from which flexible strain relief members extend which encase some of the cables. Two of these strain relief members define an area which is generally wedge-shaped and contains a web of flexible material. A generally hourglass-shaped opening in the web releasably receives a loop of another cable which extends into the housing and may be connected to another peripheral device so as to provide strain relief for that other cable. The entire assembly may be a unit molded of elastomeric material which has an opening enclosing a circuit module and forming the strain relief members and the web with its loop retaining strain relief opening. The cable assembly is especially useful in data collection installations for connecting peripheral devices such as bar code scanners and data entry keyboards to a terminal such as a personal computer.

18 Claims, 3 Drawing Sheets

5,726,388

CABLE ASSEMBLY FOR CONNECTING PERIPHERAL DEVICES TO A TERMINAL

The present invention relates to an improved cable assembly which provides strain relief for a plurality of cables which are connected to a circuit module of the assembly and particularly to a cable assembly which provides a wedge interface between peripheral devices and a terminal.

The invention is especially suitable for use in data collection systems where different types of peripheral devices are connected to a terminal; the devices being selected from bar code scanners, keyboards, radio or radiant energy transmitters and receivers such as may be part of a radio link to a central computer or file server which contains information, such as the prices of items which must be accessed by the terminal. The cable assembly provides a so-called "wedge" interface which contains circuitry so as to enable the peripheral devices to be compatible with the terminal.

BACKGROUND OF THE INVENTION

Various types of wedge interfaces are used in data collection systems especially those involving bar code scanners and readers. Such systems include digital electronics having integrated circuit chips for data handling and computation purposes. Such wedge units may require several cables in order to provide connections to peripheral equipment as well as to the terminal. The cable assemblies are subject to stress and strain as the peripheral devices are moved about by the operator. For example the operator may use a hand held bar code scanner connected to the terminal via the wedge. The bar code scanner is moved to enable items remote from the terminal, such as on different parts of a counter or adjacent to the counter on which the terminal is mounted, to be scanned. Then the cables connected to the wedge assembly may be twisted and turned and are subject to repeated strain. Strain relief members are used to counteract such strain. However, additional cables may be required to accommodate additional peripheral devices or even additional terminals. Reliable operation requires strain relief for the additional cables. Obtaining such strain relief and protecting the additional cables against damage, without having a complete collection of wedge cable assemblies to accommodate different complements of cables, is desired in order to avoid the increased cost of a complement of cable assemblies and yet retain the flexibility of being able to use wedge assemblies having different complements of cables.

SUMMARY OF THE INVENTION

Accordingly it is the principal object of the invention to provide an improved cable assembly which can accommodate cables in addition to those which are protected by strain relief members without additional strain relief members.

It is a still further object of the present invention to provide a molded, sealed wedge cable assembly which accommodates at least on additional cable without the need for molding that additional cable integrally with a stain relief member which is dedicated to the additional cable and is molded as part of the cable assembly.

Briefly described, a cable assembly embodying the invention is adapted to connect peripheral devices to a terminal of a data collection system. The assembly uses a housing which is preferably molded to enclose and encapsulate a circuit module from which cables extend through the surfaces which define the volume enclosing the circuit module. A pair of flexible strain relief members extends outwardly from the housing and define an area between these strain relief members. This area contains a web which is preferably molded together with the strain relief members and the housing out of elastomeric plastic material so as to provide flexibility. The web has an opening with a neck. The opening except from the neck is wider than the additional cable such that a loop of the additional cable can be retained in the opening. The loop, the web and the pair of strain relief members are all flexible such that strain relief is provided for the additional cable.

BRIEF DESCRIPTION OF THE DRAWINGS

The foregoing and other objects, features and advantages of the invention as well as a presently preferred embodiment thereof will become more apparent from a reading of the following description in connection with the accompanying drawings in which.

DESCRIPTION OF THE PREFERRED EMBODIMENTS

Figure 1:
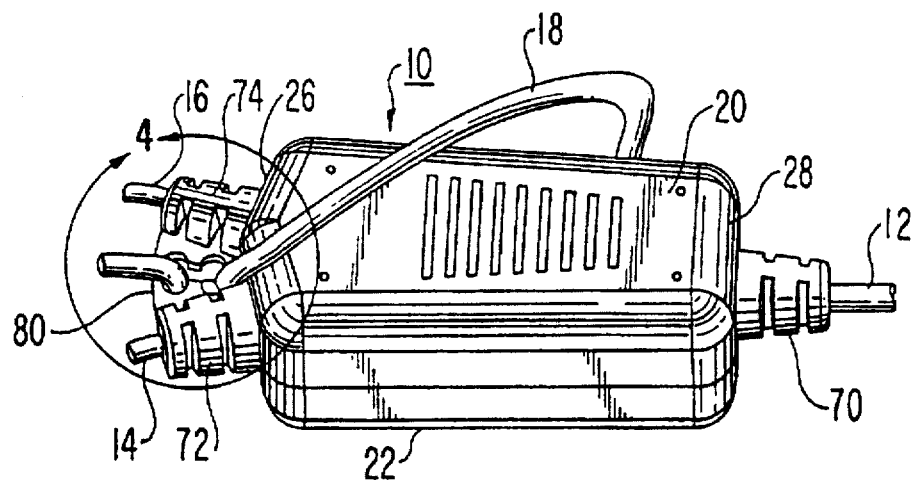
FIG. 1 is a perspective view of a cable assembly embodying the invention.
Figure 2:
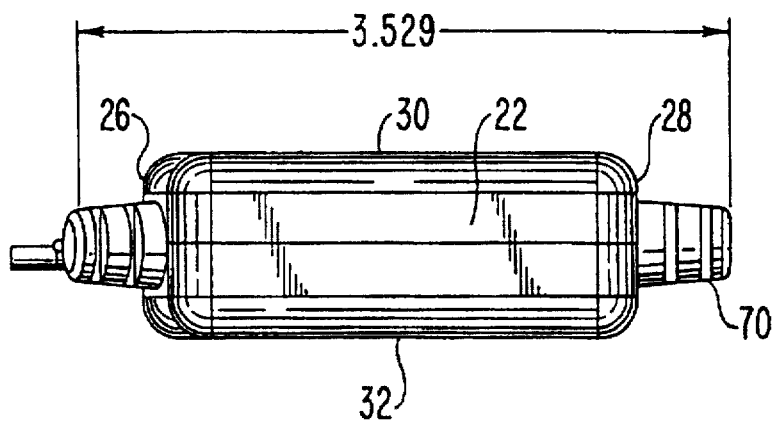
FIG. 2 is a side elevation of the cable assembly shown in FIG. 1.
Figure 3:
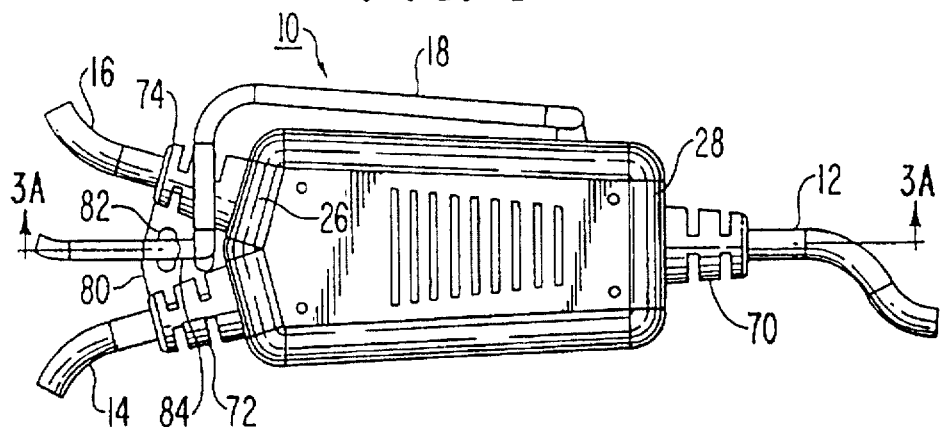
FIG. 3 is a plan view of the cable assembly shown in FIG. 1.
Figure 3A:
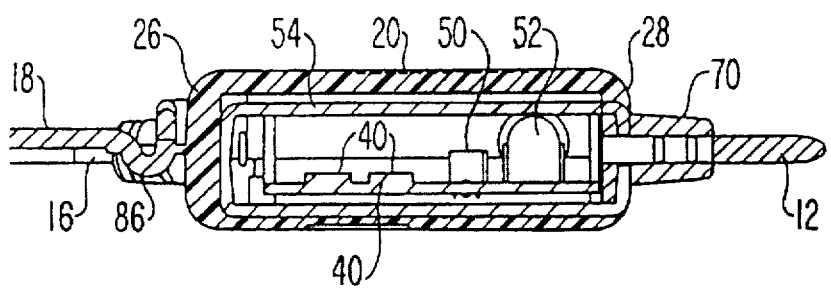
FIG. 3a is a fragmentary sectional view taken along the line 3A—3A in FIG. 3.
Figure 4:
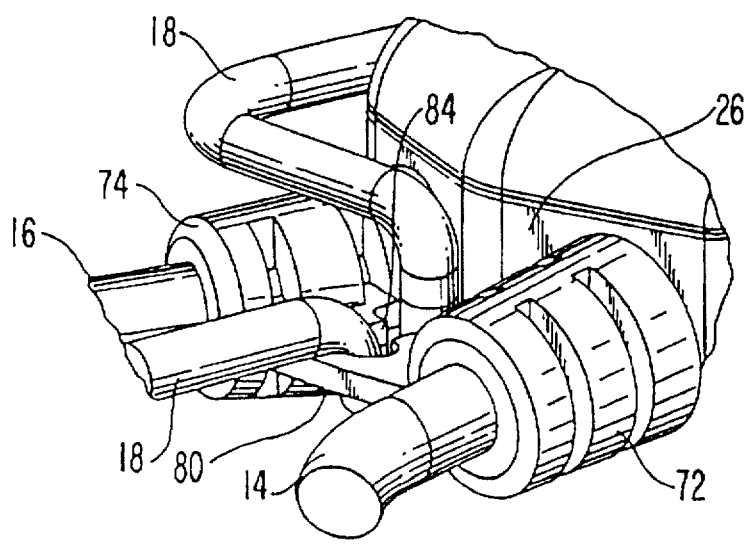
FIG. 4 is a fragmentary view of the portion of the cable assembly containing the flexible web and strain relief members which is within the area enclosed by the circle 4—4 in FIG. 1.
Figure 5A:
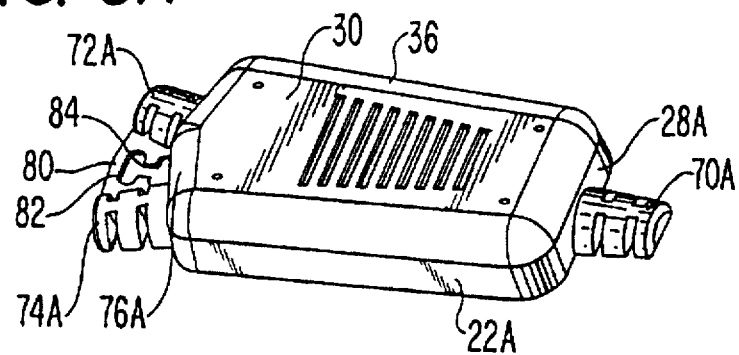
FIGS. 5A, 5B and 5C are perspective views illustrating the molded construction of the cable assembly in FIG. 1.
Figure 5B:
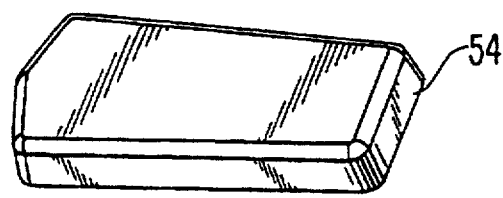
Figure 5C:
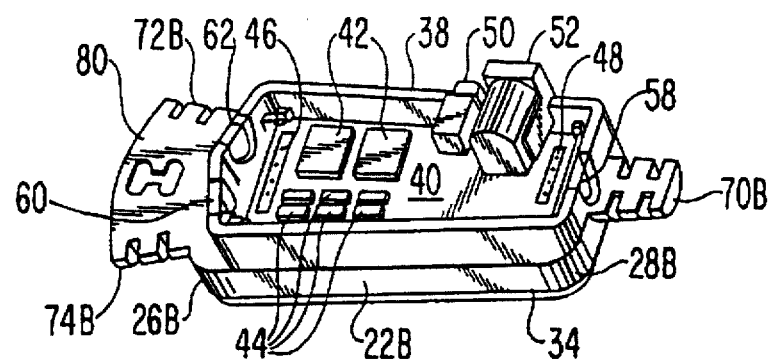

An electrical system, or wedge, which receive various peripheral devices and which interface with terminals, bar code scanners, magnetic card readers, wands and keyboards, used in data collection systems, by way of example, is the subject matter of U.S. Pat. No. 5,258,604 issued Nov. 2, 1993 to James Behrens et al. Separate cables from the electronic circuits must be provided for connection to the peripheral devices and also to the terminal. The present invention provides flexibility in installation and use of cable assemblies by enabling the cable assembly to have an additional cable connected thereto and extending therefrom. The cable is protected against damage due to strain applied thereto, as the assembly is moved about, by means of strain relief facilities which are compatible with existing cables and their strain relief facilities.

Referring to the drawings there is shown a cable assembly 10, having three cables 12, 14 and 16 and an additional cable 18, all extending from a housing 20. The housing has surfaces defining sides 22 and 24, ends 26 and 28, a top 30 and a bottom 32.

The ends 26 are formed by ends 26A and 26B and the sides are formed by sides 22A and 22B (in the case of the front side) and the other end is formed by end parts 28A and 28B when a bottom molded section 34 is overmolded with an upper molded section 36. The lower molded section forms a well 38 in which a circuit module 40, having components such as integrated circuit chips 42 and other components 44 and connectors 46, 48, 50 and 52, are located. This well is covered by a shroud 54 so as to protect the module 40 during overmolding of section 34 with section 36. There are slots or notches 58, 60 and 62 through which the cables 12, 14 and 16 respectively extend. These cables are connected to the connectors 46 and 48. The additional cable may be connected through the side of the housing to the connector 50. Still, an additional cable may be used and connected via the connector 52. Preferably only one additional cable is provided and may be connected either to the connector 50 or 52.

Molded integrally with the housing and preferably out of elastomeric material such, for example, as polyvinyl plastic which is flexible, are generally conical strain relief members 70, 72 and 74. These members have notches to increase their flexibility in a radial direction; that is, radially of the cables 12, 14 and 16 which extend therethrough. A web 80 is molded integrally with the housing 20 and the strain relief members 72 and 74 in a wedge-shaped area defined between the strain relief members 72 and 74. The area is wedge-shaped because these members 72 and 74 tilt away from each other complementary with the angle defined by the end 26. This angle has an apex along a bisector of the housing bisecting the web 80 and the strain relief member 70, and may be an internal angle of approximately 145°.

The strain relief members are molded in semi-conical sectors 70S, 72S and 74S together with the web 80 as part of the lower molded section 34. Upon overmolding the upper sectors of these conical strain relief members 70A, 72A and 74A are formed integrally with each other and with the remainder of the housing 20.

The web 80 is a plate which is sufficiently thin and which is flexibly supported by the strain relief members 72 and 74 so as to itself be flexible and provide strain relief. Along the bisector of the housing which extends through the web 80, there is an opening 82 which is divided by a neck 84. The neck is narrower than the cable 18 such that a loop 86 of the cable may be formed and held in the opening 80. This loop, in addition to the flexibility of the web 80, provides strain relief for the cable 18. The opening 82, because of the neck 84, is generally hourglass-shaped. Other shapes which may releasably hold a loop of the cable 18 may be used. In addition, if another cable is used, it may also be brought through the opening. Other similar openings to the opening may be provided in the web 80 for the additional cable. Thus, the cable assembly has flexibility for installation of other cables in addition to the three cables which extend through the strain relief members 70, 72 and 74 and are captured by being encapsulated therein. Such encapsulation occurs since the cables 12, 14 and 16 are disposed in the mold over the sectors 70B, 72B and 74B during overmolding.

Other variations and modifications in the herein-described cable assembly, within the scope of the invention, will undoubtedly suggest themselves to those skilled in the art. Accordingly, the foregoing description should be taken as illustrative and not in a limiting sense.

I claim:

1. A cable assembly for connecting electrical devices, said assembly comprising:

an electrical circuit module;

a housing having surfaces including first and second ends, sides, a top and a bottom, wherein said circuit module is disposed in said housing;

first and second flexible strain relief members extending outwardly from said first end of said housing;

a third flexible strain relief member extending outwardly from said second end of said housing;

first and second cables connected to said module extending outwardly from said first end of said housing to provide connections to first and second electrical devices, wherein said first strain relief member captures said first cable and said second strain relief member captures said second cable;

a third cable connected to said module and extending outwardly from said second end of said housing to provide a connection to a third electrical device, wherein said third strain relief member captures said third cable;

a fourth cable for providing connection to a fourth electrical device, said cable extending through one of said surfaces of said housing and connected to said module; and a web of flexible material disposed adjacent at least one of said first and second strain relief members having an opening provided with a neck, said opening being generally wider than said fourth cable and said neck providing a passage that is generally narrower than said fourth cable, the opening being adapted to releasibly receive a loop of said fourth cable therein, thereby affording strain relief for said fourth cable.

2. The assembly according to claim 1, wherein said web is generally planar and said opening is generally of hourglass shape.

3. The assembly according to claim 1, wherein said fourth cable extends through one of the sides of said housing.

4. The assembly according to claim 1, wherein said first and second strain relief members are tilted away from each other and are closer together adjacent to the first end of said housing from which said first and second strain relief members extend and farther apart away from said first end to define a wedge-shaped area between said first and second strain relief members, said web also being wedge-shaped.

5. The assembly according to claim 4, wherein said web fills said area.

6. The assembly according to claim 1, wherein said housing, said first, second, and third strain relief members and said web are an integral molded unit.

7. The assembly according to claim 6, wherein said unit is molded of elastomeric material.

8. The assembly according to claim 6, wherein said integral molded unit comprises:

a first molded section containing surfaces defining a well in which said circuit module is disposed, said first molded section also containing sectors of said first, second and third strain relief members, notches in said surfaces defining said well, said first, second and third cables extending through said notches over said sectors; and a second section of said housing molded over said first molded section sealing said well and enclosing said module and forming other sectors of said first, second, and third strain relief members to define said first, second, and third strain relief members as generally conical bodies that decrease in size as said bodies extend away from said housing.

9. The assembly according to claim 8, wherein a shroud is disposed over said well.

10. A cable assembly comprising:

a housing having walls and enclosing an electrical circuit module therein;

first, second, and third strain relief members extending outwardly from the walls;

first, second, third, and fourth cables connected to the module and extending outwardly from the walls, said first, second, and third cables extending through the first, second, and third strain relief members; and a fourth strain relief member comprising a web of flexible material disposed adjacent at least one of the first, second, and third strain relief members, the web having an opening with a restricted passage, which is narrower than the width of the fourth cable, the opening adapted to receive a loop of the fourth cable to thereby retain a portion of and afford strain relief for the fourth cable.

11. The cable assembly as claimed in claim 10, wherein the web is generally planar and the opening is generally of hourglass shape.

12. The cable assembly as claimed in claim 10, wherein the first and the second strain relief members are tilted away from each other and are closer together adjacent one of said walls of the housing from which the first and second strain relief members extend, and farther apart away from said one of said walls to define a wedge-shaped area between said first and second strain relief members.

13. The cable assembly as claimed in claim 12, wherein the web is wedge-shaped.

14. The cable assembly as claimed in claim 12, wherein the web is disposed between the first and second strain relief members and the web fills the wedge-shaped area.

15. The cable assembly as claimed in claim 10, wherein the housing, the first, second, and third strain relief members and the web are an integral molded unit.

16. The cable assembly as claimed in claim 15, wherein the unit is molded of elastomeric material.

17. The cable assembly as claimed in claim 15, wherein the integral molded unit comprises:

a first molded section having surfaces defining a well in which the circuit module is disposed; and a second section of the housing molded over the first molded section, sealing the well and enclosing the module.

18. The cable assembly as claimed in claim 17, wherein a shroud is disposed over the well.

* * * * *